Nov. 2, 1971          J. M. PEXTON          3,616,550
                      TEACHING AID

Filed Jan. 8, 1970                    2 Sheets-Sheet 1

Jane M. Pexton
INVENTOR

BY Clarence A O'Brien
and Harvey B. Jacobson
Attorneys

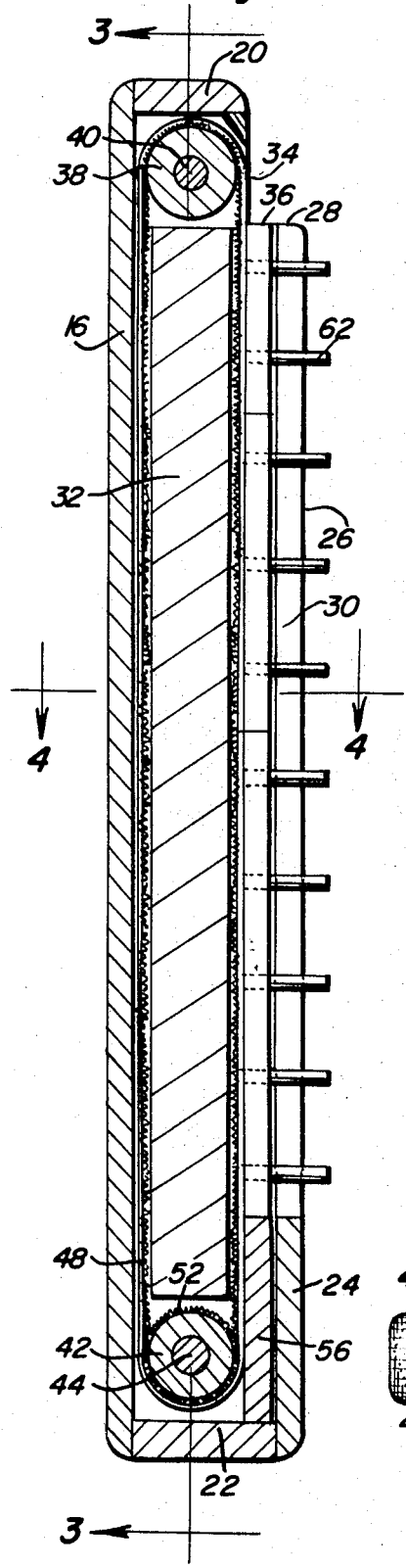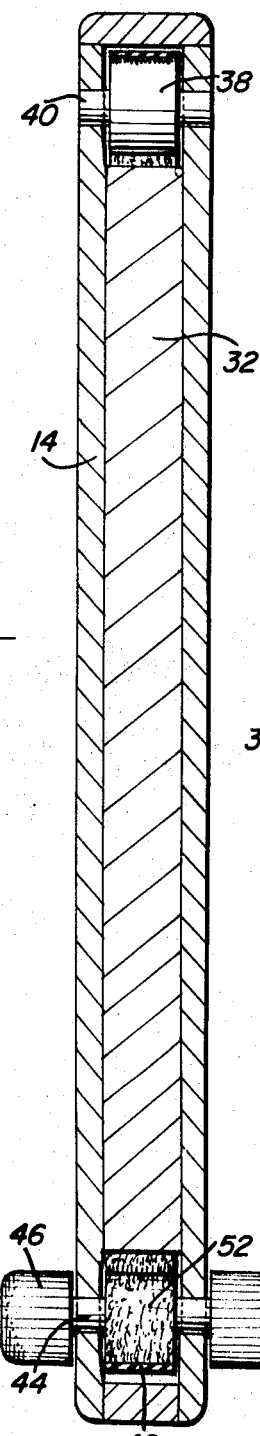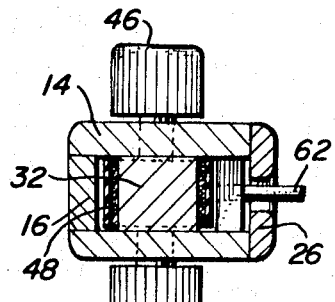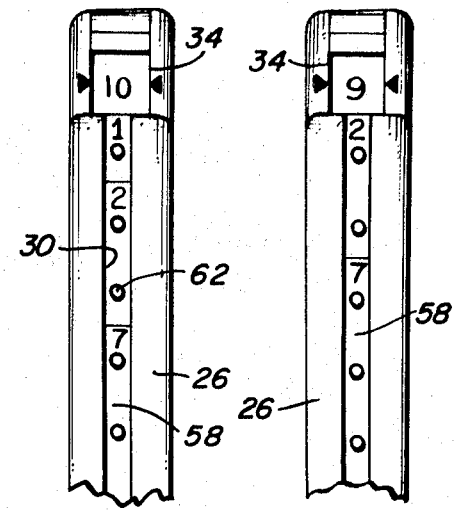

United States Patent Office 3,616,550
Patented Nov. 2, 1971

3,616,550
TEACHING AID
Jane M. Pexton, 1509 Carlton Way,
Oklahoma City, Okla. 73120
Filed Jan. 8, 1970, Ser. No. 1,374
Int. Cl. G09b 19/02
U.S. Cl. 35—31 R    7 Claims

ABSTRACT OF THE DISCLOSURE

A plurality of insert elements of different lengths representing entry quantities, are inserted into the guide portion of a teaching aid to illustrate a mathematical problem. By moving of an endless tape, on which the inserted elements are supported, to a readout position, indicia on the tape is exposed through an indicator opening representing the solution to the entered problem.

---

This invention relates to a relatively simple mechanical device to enhance the acquisition of mathematical skills.

An important object of the present invention is to provide an easily manipulated and economical device by means of which mathematical problems may be illustrated and the correct solutions indicated as a self-teaching aid for students.

In accordance with the present invention, the mathematical teaching aid is in the form of an elongated tubular housing within which an endless tape or web is disposed between opposite ends bearing indicia which is exposed adjacent one end through an indicator opening. An insert opening is formed adjacent to the indicator opening within which elements of different lengths are inserted. These elements are supported on a block carried by the tape and guided for movement along a guide portion of the housing as the tape is advanced in one direction by means of an adjusting knob. The indicia on the tape is coordinated with the lengths of the insert elements so that when the tape is moved to a readout position, the solution to the problem represented by the insert elements, will appear in the indicator opening.

These together with other objects and advantages which will become subsequently apparent reside in the details of construction and operation as more fully hereinafter described and claimed, reference being had to the accompanying drawings forming a part hereof, wherein like numerals refere to like parts throughout, and in which:

FIG. 2 is a side sectional view taken substantially through a plane indicated by section line 2—2 of FIG. 1.

FIG. 3 is a rear sectional view taken substantially through a plane indicated by section line 3—3 in FIG. 2.

FIG. 4 is a transverse sectional view taken substantially through a plane indicated by section line 4—4 in FIG. 2.

FIG. 5 is a partial front elevational view of the teaching aid showing the solution to one inserted problem.

FIG. 6 is a partial front elevational view of the teaching aid illustrating the solution to another problem.

Figure 1:
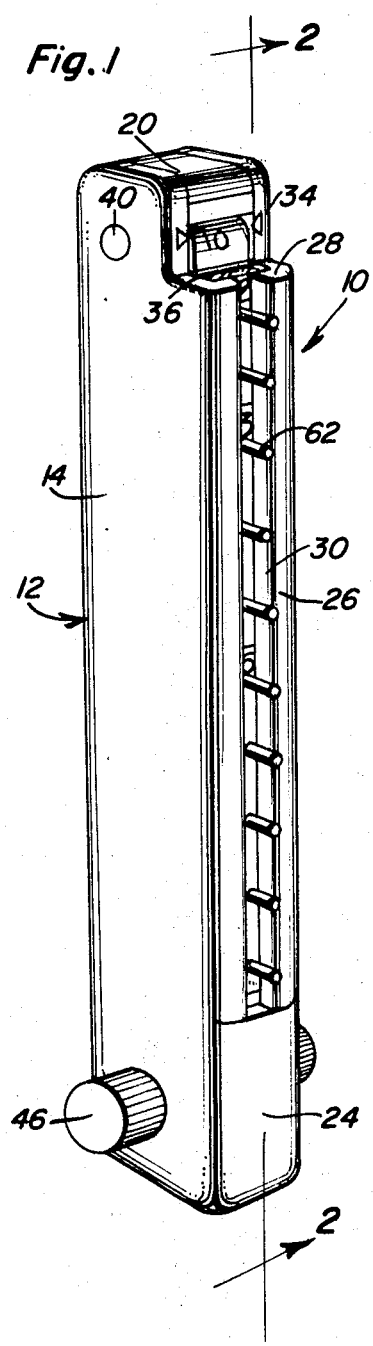
FIG. 1 is a perspective view illustrating one embodiment of the present invention.

Referring now to the drawings in detail, and initially to FIG. 1, the teaching aid device which is generally referred to by reference numeral 10 includes an elongated housing generally denoted by reference numeral 12. In the illustrated embodiment, the housing is generally rectangular in cross-section although other cross-sectional shapes may be utilized. Thus, the housing 12 includes parallel spaced side portions 14 interconnected by a back wall 16 as shown in FIG. 2 and by a top wall 20 and a bottom wall 22 at opposite longitudinal ends of the housing. A front panel 24 also interconnects the side portions 14 adjacent the bottom end wall 22 and is flush with the parallel spaced guide portions 26 that extend longitudinally toward the end wall 20 terminating at a shoulder 28 spaced from the end wall. A guide slot 30 is formed between the guide portions which are also spaced from an internal spacing block 32 between the side wall portions 14, the opposite ends of the block 32 being spaced from the end walls 20 and 22. An indicator opening 34 is formed adjacent to the end wall 20 while an insert opening 36 is formed at the shoulder 28 at right angles to the indicator opening 34.

An idler roller or spool 38 is rotatably mounted within the space formed between the upper end of the block 32 and the end wall 20 by means of a roller shaft 40 extending into the side portions 14 of the housing. A drive roller 42 on the other hand is rotatably mounted by a shaft 44 within the space between the lower end wall 22 and the lower end of the block 32 as more clearly seen in FIG. 2. Adjustment knobs 46 are connected to the opposite ends of the roller shaft 44 outside of the housing for manipulation by the user.

Figure 9:
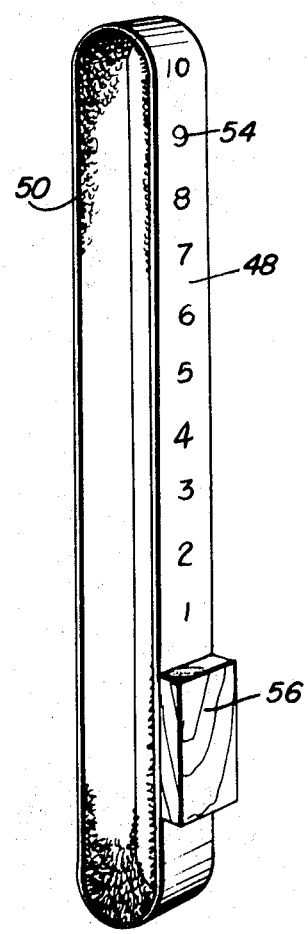
FIG. 9 is a perspective view of the endless web or tape and displacing block mounted within the teaching aid.

An endless tape or web 48 as more clearly seen in FIG. 9, is entrained about the rollers 38 and 42 as more clearly seen in FIG. 2. In order to obtain a positive drive between the drive spool 42 and the endless web or tape 48, a "Velcro" type of fastener fabric panel 50 internally lines the tape. This panel 50 has loop filaments which cooperate with hook filaments projecting from a cooperating fabric fastener panel 52 externally lining the drive spool 42. Meshing engagement is thereby obtained between the fabric fastener panels for a self-locking drive relationship between the drive spool 42 and the endless tape. Thus, by means of the adjustment knobs 46, the user may position the tape to a readout position as will be explained hereinafter.

The external surface of the tape 48 carries indicia 54 adapted to be exposed through the indicator opening 34 adjacent the end wall 20 of the housing. Also fastened to the outside surface of the tape is a displacing block 56 adapted to be moved to a readout position by means of the adjustment knobs 46. The block 56 is accordingly slidably mounted between the guide portions 26 of the housing for movement upwardly from the fully retracted position shown in FIG. 2.

Figure 7:
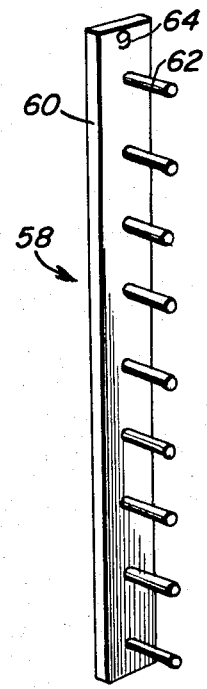
FIG. 7 is a perspective view illustrating one of the insert elements to be utilized with the teaching aid.
Figure 8:
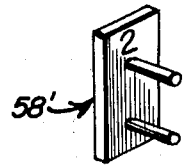
FIG. 8 is a perspective view of another insert element.

A plurality of insert elements are adapted to be slidingly received between the guide portions 26 of the housing and supported on the displacing block 56. The insert elements are of different lengths such as the insert elements 58 and 58', respectively illustrated in FIGS. 7 and 8. Each insert element includes an elongated, rectangular body 60 having a predetermined number of pegs 62 projecting therefrom and labeled by indicia 64 which corresponds to the length of the insert element. The body 60 of the insert element is dimensioned to be slidingly received between the slide formations of the guide portion 26 and the tape 48 when inserted through the opening 36 while the pegs 62 project through the slot 30 formed between the slide formations.

In order to utilize the teaching aid device, a mathematical problem is entered by selecting insert elements of lengths representing the desired entry quantities. The selected insert elements are then inserted through the opening 36 and stacked behind the guide portions 26 resting on or in abutment with the displacing block 56 secured to the tape. The displacing block 56 is then positioned by displacement of the tape 48 through the adjustment knobs 46 until the upper end of the uppermost insert element is flush with the shoulder 28 exposing the upper end portion of the tape through the indicator opening 34. The indicia on the tape will then present the solution to the problem represented by the entered quantities corresponding to the different length insert elements. For example, as shown in FIG. 5, three insert elements corresponding in length to quantities 7, 2 and 1 when positioned by the block 56 in a readout position will expose a solution on the tape through the indicator window 34 representing the sum of the entered quantities corresponding to the insert elements. FIG. 6 illustrates another solution of another problem. The length of the insert elements is not only identified by the labeling indicia thereon but by the number of pegs 62 projecting through the guide slot 30.

It should be appreciated, that other mathematical problems and solutions may be accommodated such as multiplication and division of entry quantities corresponding to the different length insert elements by utilizing appropriate indicia on the endless web or tape 48. Also, mathematical problems may be solved in connection with quantities such as Roman numerals, angles, fractions, etc. Appropriate coloring may be utilized for the insert elements and facilities provided for replacement of the endless web in order to convert the teaching aid device for use in connection with different problems.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An educational device comprising an elongated housing, an endless web having indicia mounted thereon, means supporting the web adjacent opposite ends of the housing, said housing having an insert portion spaced from one of said ends, an indicator opening at said one of the ends exposing the indicia on the web and a guide portion extending from the insert portion toward the other of the ends, a plurality of insert elements of different lengths adapted to be received in the guide portion through the insert portion of the housing, a displacing block mounted on the web against which the insert elements are adapted to abut, and drive means operatively connected to the web supporting means for movement of the web and the displacing block to a readout position exposing indicia through the indicator opening when the insert elements completely occupy the guide portion between the displacing block and the insert portion.

2. The combination of claim 1 wherein said guide portion of the housing includes spaced guide portions on the housing forming a slot, each of said insert elements having an elongated slide body and pegs projecting therefrom dimensioned to extend through the slot.

3. The combination of claim 2 wherein said insert portion is formed by a shoulder between the guide portion and the indicator opening.

4. The combination of claim 3 wherein said drive means includes a fabric fastener panel externally mounted on the web supporting means at the other end of the housing, a cooperating fabric fastener panel internally mounted by the web, and an adjustment knob connected to the web supporting means at said other of the ends of the housing spaced from the guide portion.

5. The combination of claim 1 wherein said drive means includes a fabric fastener panel externally mounted on the web supporting means at the other end of the housing, a cooperating fabric fastener panel internally mounted by the web, and an adjustment knob connected to the web supporting means at said other of the ends of the housing spaced from the guide portion.

6. The combination of claim 5 wherein said guide portion of the housing includes spaced guide portions on the housing forming a slot, each of said insert elements having an elongated slide body and pegs projecting therefrom dimensioned to extend through the slot.

7. The combination of claim 1 wherein said insert portion is formed by a shoulder between the guide portion and the indicator opening.

References Cited

UNITED STATES PATENTS

| 1,093,690 | 4/1914 | Freeman | 35—76 X |
| 3,372,884 | 3/1968 | Nagano | 242—95 X |

WILLIAM H. GRIEB, Primary Examiner

U.S. Cl. X.R.

35—76